United States Patent [19]
Webb

[11] 4,290,144
[45] Sep. 15, 1981

[54] RADIO COMMUNICATIONS SYSTEMS

[75] Inventor: J. Stuart Webb, Reading, England

[73] Assignee: The Secretary of State for Defence in Her Britannic Majesty's Government of the United Kingdom of Great Britain and Northern Ireland, London, England

[21] Appl. No.: 114,170

[22] Filed: Jan. 22, 1980

[30] Foreign Application Priority Data

Jan. 22, 1979 [GB] United Kingdom ............... 02296/79

[51] Int. Cl.³ .............................................. H04B 1/00
[52] U.S. Cl. ....................................... 455/63; 455/98; 455/108; 455/118
[58] Field of Search ....................... 455/39, 47, 63, 98, 455/108, 109, 118, 312; 370/69

[56] References Cited

U.S. PATENT DOCUMENTS

| 1,841,142 | 1/1932 | Mathes | 455/118 |
| 3,492,580 | 1/1970 | Berman | 455/47 |
| 3,803,490 | 4/1974 | Almering et al. | 455/47 |

Primary Examiner—Marc E. Bookbinder
Attorney, Agent, or Firm—Pollock, Vande Sande & Priddy

[57] ABSTRACT

A radio communications system for aircraft, particularly useful at UHF frequencies and in aircraft travelling at high speed and low level where rapid phase and amplitude fluctuations degrade intelligible speech transmission. The system comprises a transmitter in a first aircraft, the transmitter including an upshift frequency translator for transferring the frequency band of an input signal from a microphone to a higher band, and further including an amplitude modulator for modulating the frequency translated signals; and a receiver in a second aircraft arranged to receive and demodulate the transmitted signals, the receiver including a high pass filter for removing noise from the demodulated signal, and a downshift frequency translator for transferring the frequency band of the filter output to a lower band.

3 Claims, 3 Drawing Figures

RADIO COMMUNICATIONS SYSTEMS

The present invention relates to radio communications systems for aircraft and in particular relates to systems for speech communication between two or more aircraft.

Radio communications, particularly at UHF frequencies, between aircraft travelling at high-speed and low-level often suffer serious degradation, particularly when the aircraft are over rough terrain. When aircraft traverse rough terrain at high speed ie above about 200 m/sec, rapid phase and amplitude fluctuations of UHF transmission are experienced and intelligible speech transmission is often impossible.

The present invention provides a receiver and transmitter system for amplitude modulated signal transmission between aircraft which reduces deleterious effects introduced by high-speed, low-level flight.

According to the present invention a radio communications system for aircraft comprises:

a transmitter for a first aircraft, the transmitter including a first frequency translator for transferring the frequency band of an input signal to a higher band, and an amplitude modulator for modulating the output from the first frequency translator, and a receiver for a second aircraft for receiving the modulated signal from the transmitter, the receiver including a demodulator arranged to demodulate the received signal, high pass filter for removing noise from the demodulated signal, a and a second frequency translator for transferring the frequency band of the output from the filter to a lower band.

In a preferred embodiment of the invention the transmitter frequency is in the UHF band.

The first frequency translator may be arranged to transfer the frequency band of the input signal to a higher band which has a mean frequency about 500 Hz above that of the input signal.

Radio communication between aircraft flying in formation involves direct propagation and ground reflected propagation of which the latter gives rise to noise occupying a band of very low acoustic frequencies whose frequency extent is proportional to the ground speed of the aircraft and the carrier frequency used. In UHF AM communications equipment and at high ground speeds the noise occupies a significant proportion of the audio band thus making speech communication difficult if not impossible.

An embodiment of the invention will now be described by way of example only with reference to the accompanying drawings which are schematic circuit diagrams and of which:

Figure 1:
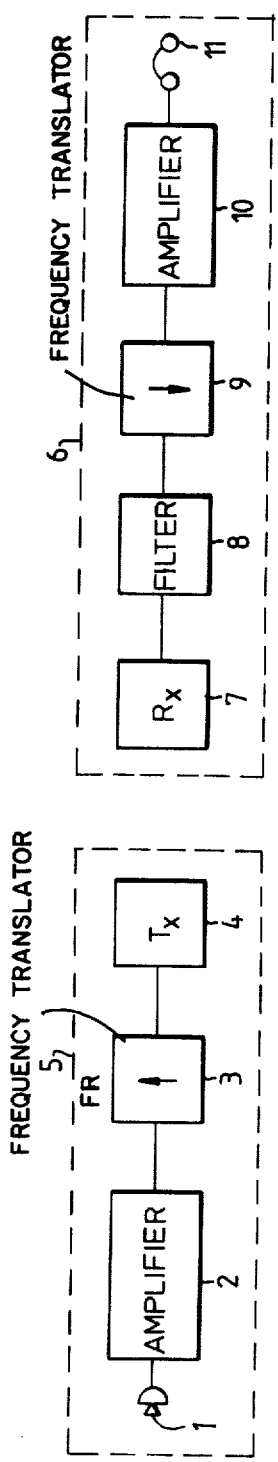
FIG. 1 is a diagram of an aircraft UHF radio communications system which includes a transmitter circuit and a receiver circuit.

In FIG. 1 a transmitter circuit 5 is housed in a first aircraft (not shown) and a receiver circuit 6 is housed in a second aircraft (also not shown).

The transmitter circuit 5 includes a microphone 1 from which speech signals are fed to an amplifier 2. The amplifier 2 has an output which is fed to a frequency translator 3 which is arranged to transfer the speech signal frequency band to a higher band by raising it by 500 Hz. A transmitter 4 which includes an amplitude modulator (not shown) for modulating the output from the first frequency translator 3 transmits the modulated signal at a UHF carrier frequency from the first aircraft to the second aircraft.

Figure 2:
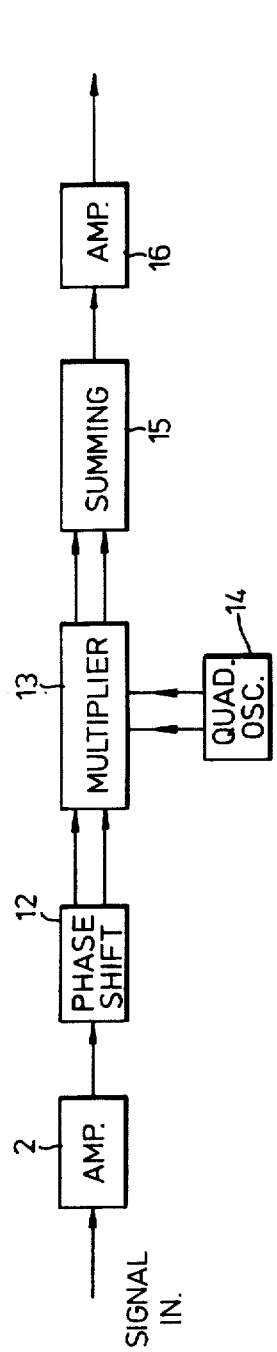
FIG. 2 shows an upshift frequency translator and amplifiers which form part of the transmitter circuit of FIG. 1.

In FIG. 2, the amplifier 2 corresponds to the amplifier of FIG. 1 and the frequency translator 3 of FIG. 1 is shown in more detail as a quadrature phase shifter 12 which has twin outputs carrying signals one of which is 90° out of phase with the other, a multiplier 13 which receives the signals from the phase shifter 12, a quadrature oscillator 14 which feeds the multiplier 13 at 500 Hz, and a summing unit 15 which receives dual outputs from the multiplier 13. The frequency translator generates a single sideband signal by phase shift, the upper sideband being retained, which is amplified in an amplifier 16 before transmission in the transmitter 4 of FIG. 1.

The receiver assembly 6 in the second aircraft includes a receiver 7 which receives and demodulates UHF transmissions from the first aircraft. The demodulated signal is passed through a high pass filter 8 which passes speech information and, under high speed flight conditions, rejects noise generated by ground reflection of the UHF transmissions. The signal from the filter 8 is frequency translated to a lower frequency band corresponding to the original speech signal band by a frequency translator 9. The signal from the translator 9 is amplified in amplifier stages 10 and the amplified signal fed to earphones 11.

Figure 3:
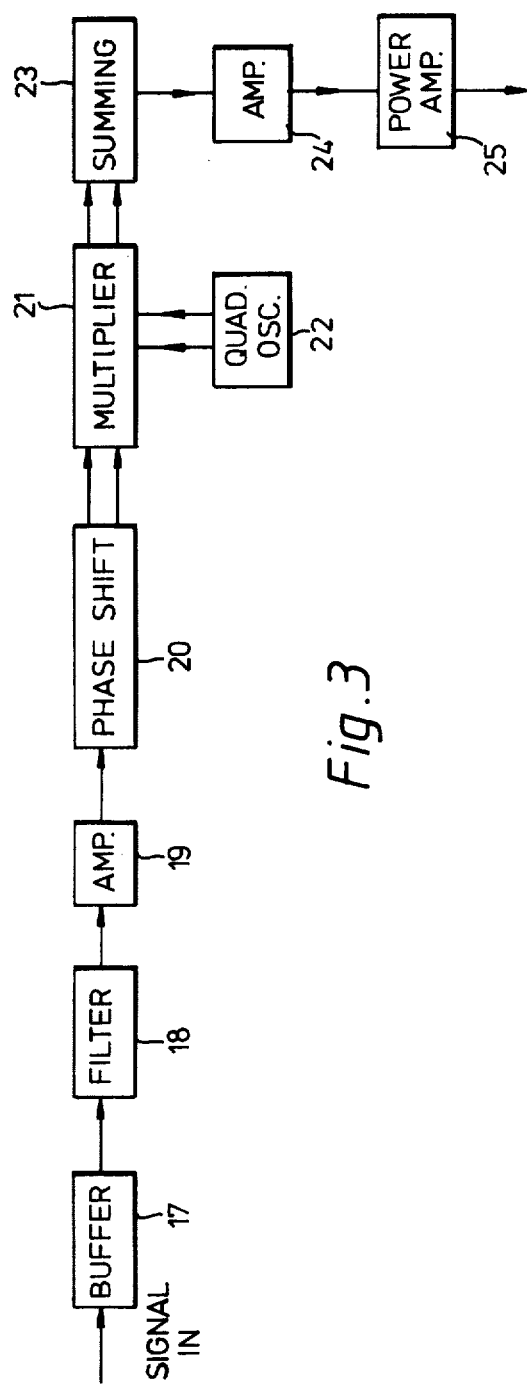
FIG. 3 shows a downshift frequency translator and amplifiers which form part of the receiver circuit of FIG. 1.

Referring to FIG. 3 a buffer 17 forms part of the receiver 7 of FIG. 1 and a filter 18 corresponds to the filter 8 of FIG. 1. The filter 18 has a single output which is processed in a downshift frequency translator shown as translator 9 in FIG. 1 and which comprises an amplifier 19, a quadrature phase shifter 20 which has twin outputs one of which is 90° out of phase with the other, a multiplier 21 which receives the signals from the phase shifter 20, a quadrature oscillator 22 which feeds the multiplier 21 at 500 Hz, and a summing unit 23 which receives dual outputs from the multiplier 21. The amplifier stages 10 of FIG. 1 comprise a preamplifier 24 and a power amplifier 25 as shown in FIG. 3. The downshift frequency translator generates upper and lower sidebands, retaining the lower sideband.

Clearly many variations or modifications of such a radio communications system will be apparent to persons skilled in the art. For example, the frequency translation of 500 Hz may be varied to suit the particular conditions to be encountered and indeed it may be useful to employ variable frequency translation to optimize speech clarity over a range of ground speeds.

The invention may be of application to inter-helicopter communications where there may be a degree of transmitted signal corruption by reflections from the rotor blades of the helicopter.

I claim:

1. A radio communications system for aircraft, for use in improving speech communication between aircraft travelling at high speed and low level where rapid phase and amplitude fluctuations degrade intelligible speech transmission, comprising a transmitter carried in a first aircraft, said transmitter including a microphone and an upshift frequency translator connected to receive an input signal from said microphone and arranged to transfer the frequency band of said input signal to a higher band, and an amplitude modulator connected to receive frequency translated signals from the upshift translator and arranged to modulate said frequency signals, and a receiver carried in a second aircraft arranged to receive said modulated signals from the transmitter, said receiver including a demodulator for demodulating the received signals, a high pass filter for removing noise from the demodulated signal, and a downshift frequency translator connected to receive output from the filter and arranged to transfer the frequency band of the output to a lower band.

2. A radio communications system as in claim 1 wherein said transmitter has a transmission frequency in the UHF band.

3. A radio communications system as in claim 1 wherein the upshift frequency translator is arranged to transfer the frequency band of said input signal to a band having a mean frequency which is about 500 Hz above that of said input signal.

* * * * *